(12) United States Patent
Shim et al.

(10) Patent No.: US 11,380,217 B2
(45) Date of Patent: Jul. 5, 2022

(54) INTEGRATED STEEP SLOPE COLLAPSE SIMULATION SYSTEM

(71) Applicant: NATIONAL DISASTER MANAGEMENT RESEARCH INSTITUTE, Ulsan (KR)

(72) Inventors: Jae Hyun Shim, Ulsan (KR); Min Su Jung, Ulsan (KR); Sung Yong Park, Ulsan (KR); Geon Ha Na, Ulsan (KR); A Reum Cha, Ulsan (KR); Chun Joo Lee, Seoul (KR)

(73) Assignee: NATIONAL DISASTER MANAGEMENT RESEARCH INSTITUTE, Ulsan (KR)

( * ) Notice: Subject to any disclaimer, the term of this patent is extended or adjusted under 35 U.S.C. 154(b) by 898 days.

(21) Appl. No.: 16/195,938

(22) Filed: Nov. 20, 2018

(65) Prior Publication Data

US 2019/0164454 A1     May 30, 2019

(30) Foreign Application Priority Data

Nov. 24, 2017    (KR) ........................ 10-2017-0158266

(51) Int. Cl.
*G09B 23/40*        (2006.01)
*G06G 7/48*         (2006.01)
*G09B 25/02*        (2006.01)

(52) U.S. Cl.
CPC ............ *G09B 23/40* (2013.01); *G09B 25/025* (2013.01)

(58) Field of Classification Search
CPC ....... G09B 23/40; G09B 25/025; G06F 30/17; G06F 30/20

(Continued)

(56) References Cited

U.S. PATENT DOCUMENTS

2006/0291959 A1*   12/2006   Crea ........................ E02F 5/102
                                                             405/179

FOREIGN PATENT DOCUMENTS

KR    10-2012-0073406 A    7/2012
KR    10-2015-0137295 A    12/2015
KR       10-1688067       12/2016

OTHER PUBLICATIONS

Okada et al. (Subsurface Water Movement and Downslope Deformation in Model-Slope Tests by Artificial Rainfall, (8 pages)). (Year: 2006).*

(Continued)

*Primary Examiner* — Andre Pierre Louis
(74) *Attorney, Agent, or Firm* — Harness, Dickey & Pierce, P.L.C.

(57) ABSTRACT

Provided is an integrated steep slope collapse simulation system including: a base; a tower provided at one end of the base; a soil tank structure having one side being connected to the tower so that the soil tank structure is inclined, the soil tank structure being filled with soil, and the soil being rammed; a work platform provided with a working stand moving along the base and moving up and down; a soil moving device supplying soil to an interior of the soil tank structure; an artificial rainfall device provided above the soil tank structure, the artificial rainfall device injecting water downward toward the soil rammed inside the soil tank structure; and an underground water reproduction device injecting water upward through the bottom surface of the soil tank structure from the underside of the soil rammed in the soil tank structure. There is an effect that it is possible to accurately analyze an actual behavior of soil in the natural environment.

10 Claims, 5 Drawing Sheets

(58) Field of Classification Search
USPC .......................................................... 703/6, 8
See application file for complete search history.

(56) References Cited

OTHER PUBLICATIONS

Office Action from corresponding Korean Patent Application No. 10-2017-0158266, dated Jun. 3, 2019.
Youtube video, entitled "Chaba landslide experiment", <https://www.youtube.com/watch?v=E61ew6wbe_g>, dated Sep. 21, 2017.

* cited by examiner

INTEGRATED STEEP SLOPE COLLAPSE SIMULATION SYSTEM

CROSS REFERENCE TO RELATED APPLICATIONS

This application claims priority to Korean Patent Application No. 10-2017-0158266, filed on 24 Nov. 2017 in the Korean Intellectual Property Office, the disclosure of which is incorporated herein by reference in its entirety.

TECHNICAL FIELD

The present invention relates to an integrated steep slope collapse simulation system and, more particularly, to an integrated steep slope collapse simulation system capable of assisting in analyzing a behavior of soil in a steep slope by simulating a natural environment.

BACKGROUND

In Korea, there are a lot of slopes due to geographical characteristics of mountainous regions. In addition, due to climatic characteristics that about two-thirds of the annual average rainfall is concentrated at a specific period of time, the slope collapse frequently occurs.

The slope collapse has caused great damage to public safeties and properties, and thus, much effort has been made to reduce the damage. However, the disaster of the slope collapse has been increasing due to an abnormal change in climate.

Due to the geographical and climatic characteristics, it is not easy to predict and prevent the slope collapse caused by an abnormal change in climate such as heavy rainfall and typhoon every summer.

In recent years, studies have been made to reduce the damage caused by the slope collapse by providing a device or system capable of analyzing a behavior of soil on the slope. However, it has been difficult to simulate an environment similar to the slope in a natural environment so far, and thus, it is difficult to acquire accurate information on the behavior of the soil on the slope.

As a cited document, there is a Korean Patent Application No. 10-2015-0160405 (Registration No. 10-1688067), entitled by a simulation device for debris test.

SUMMARY

The present invention is to provide an integrated steep slope collapse simulation system capable of assisting in analyzing an actual behavior of soil in a steep slope by simulating a natural environment.

The present invention is to provide an integrated steep slope collapse simulation system capable of easily adjusting an angle of a slope.

According to an aspect of the present invention, there is provided an integrated steep slope collapse simulation system including: a base; a tower provided at one end of the base; a soil tank structure having one side being connected to the tower so that the soil tank structure is inclined, the soil tank structure being filled with soil, and the soil being rammed; a work platform provided with a working stand moving along the base and moving up and down; a soil moving device supplying soil to an interior of the soil tank structure; an artificial rainfall device provided above the soil tank structure, the artificial rainfall device injecting water downward toward the soil rammed inside the soil tank structure; and an underground water reproduction device injecting water upward through the bottom surface of the soil tank structure from the underside of the soil rammed in the soil tank structure.

In the aspect, the soil tank structure may include: a first soil tank provided vertically movably in the tower; a second soil tank having one end rotatably connected to one end of the first soil tank; a third soil tank having one end rotatably connected to the other end of the second soil tank; and a fourth soil tank having one end rotatably connected to the other end of the third soil tank.

In addition, the first soil tank may be moved up and down by a hydraulic cylinder provided to the base, and the third soil tank and the fourth soil tank may be rotated by hydraulic cylinders provided to the slider.

In addition, a door which is opened and closed by a hydraulic cylinder may be provided to the other end of the fourth soil tank, and a slope plate inclined downward may be provided on the bottom surface of the other end of the fourth soil tank.

In addition, the soil tank structure may be provided with a passage on and a transparent window along a side surface thereof.

In addition, a plurality of angulated tubes may be separated from each other so as to protrude from the bottom surface of the soil tank structure so that the angulated tubes are perpendicular to an inclination direction of the soil tank structure, and the angulated tubes may be connected to the underground water reproduction device and have discharge holes formed at certain intervals to discharge water supplied from the underground water reproduction device through the discharge holes.

In addition, the soil moving device may include: a primary hopper into which soil is introduced; a conveyor receiving the soil from the primary hopper and conveying the soil; and a secondary hopper receiving the soil from the conveyor.

In addition, a soil supply hole being elongated in a left/right direction may be formed at a central portion of the working stand, and the work platform is provided with a hoist, and the hoist may lift up the secondary hopper and allows the interior of the soil tank structure to be filled with the soil through the soil supply hole while moving left and right along the soil supply hole.

In addition, the artificial rainfall device may be provided with a fixed nozzle at a center thereof and variable nozzles rotating at a certain angle on both sides of the fixed nozzle.

In an integrated steep slope collapse simulation system according to the present invention rainwater is supplied to soil rammed in an inclined soil tank structure by an artificial rainfall device, and underground water is supplied by an underground water reproduction device, so that an environment as similar as possible to a natural environment is reproduced, and thus, there is an advantage that it is possible to analyze an actual behavior of the soil in the natural environment as accurately as possible.

In addition, since the angle of the soil tank structure can be freely adjusted, there is an advantage that the collapse experiment can be performed on the slope having various angles.

In addition, since the second hopper supplies the soil to the soil tank structure while moving at a constant speed at the soil supply hole formed in the work platform of the work platform, there is an advantage that the soil can be uniformly supplied.

DETAILED DESCRIPTION

Hereinafter, an embodiment of an integrated steep slope collapse simulation system according to the present invention will be described in detail with reference to the accompanying drawings.

Figure 1A:
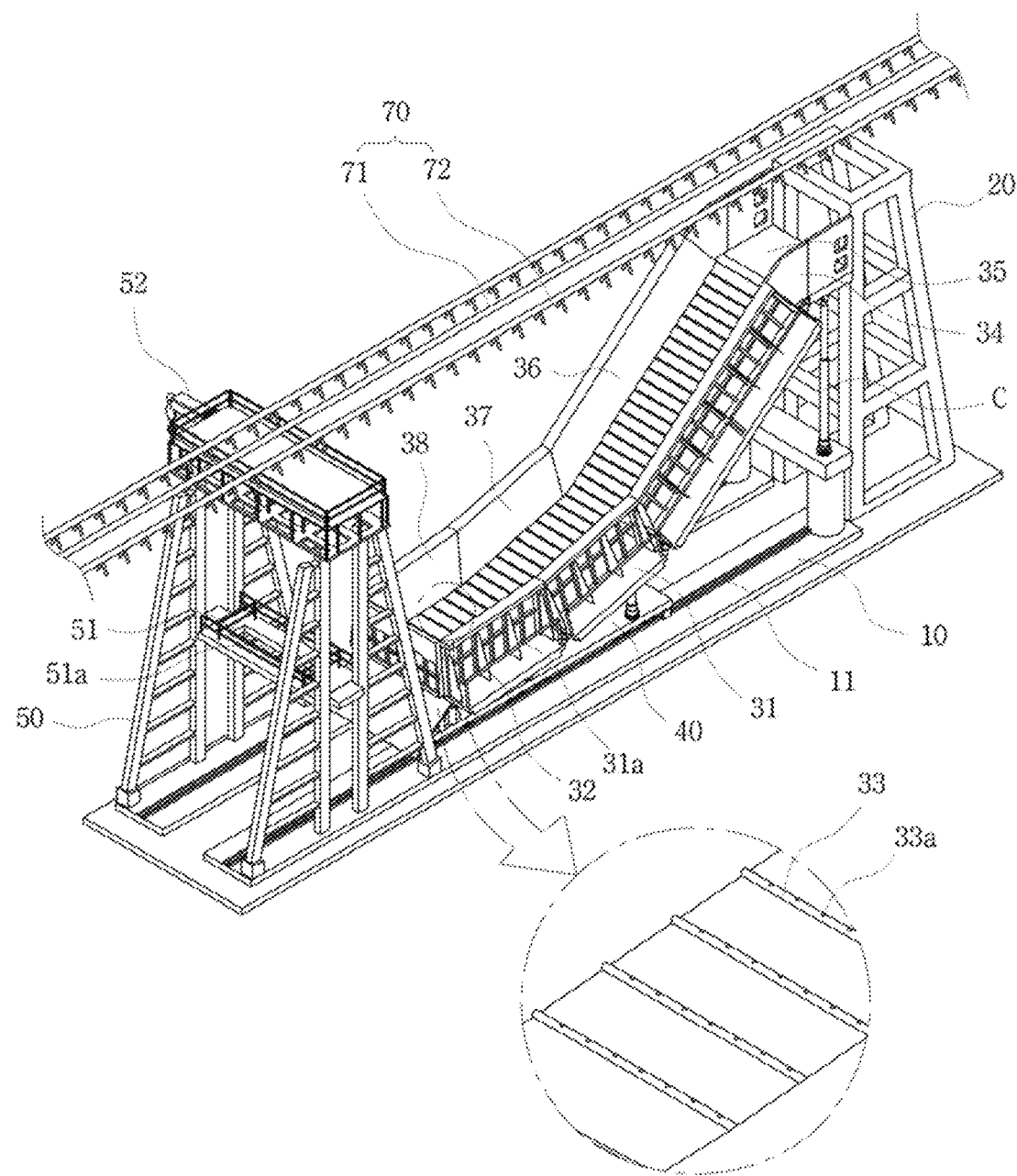
FIGS. 1A and 1B are perspective views of an integrated steep slope collapse simulation system according to the present invention.
Figure 1B:
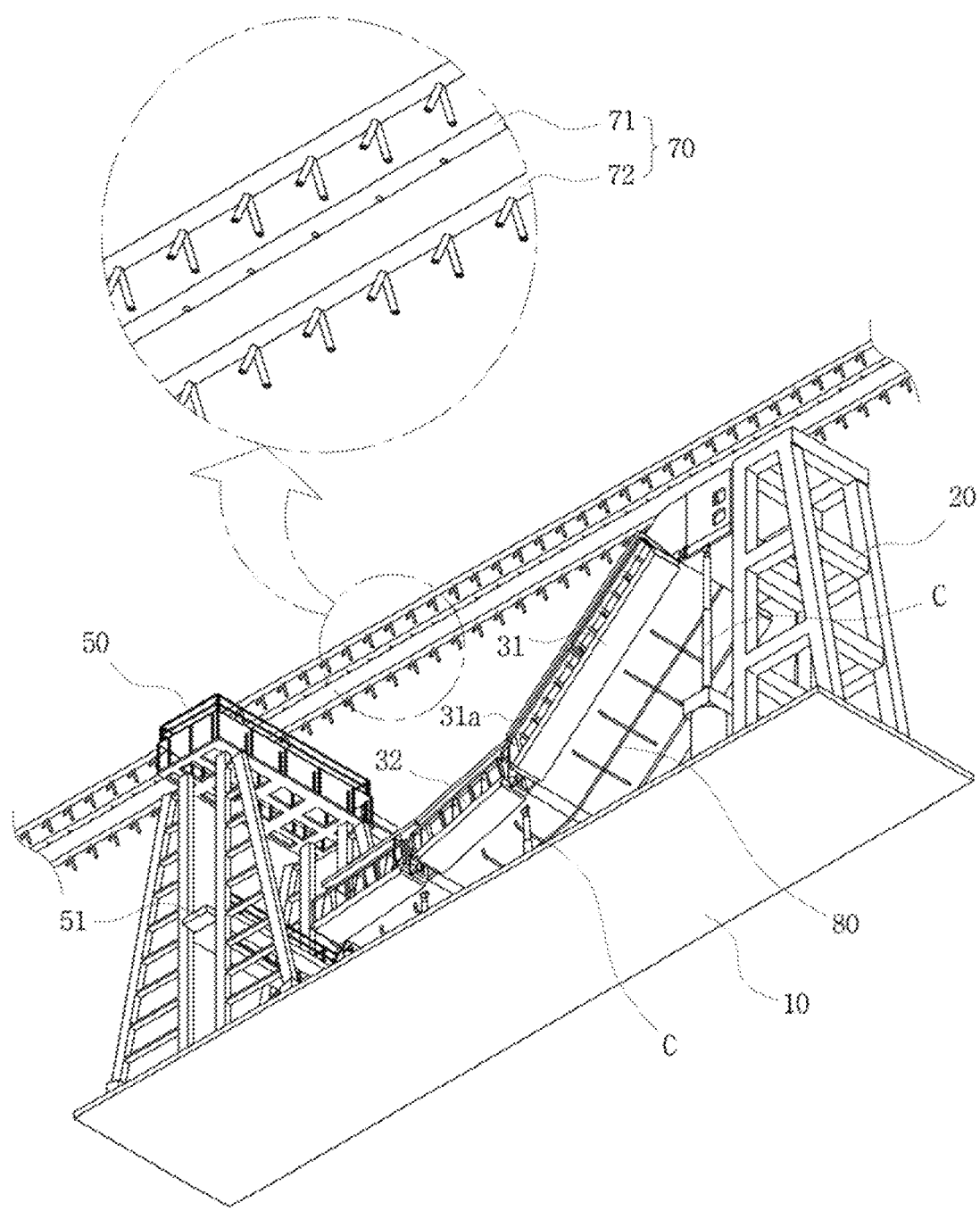
Figure 2A:
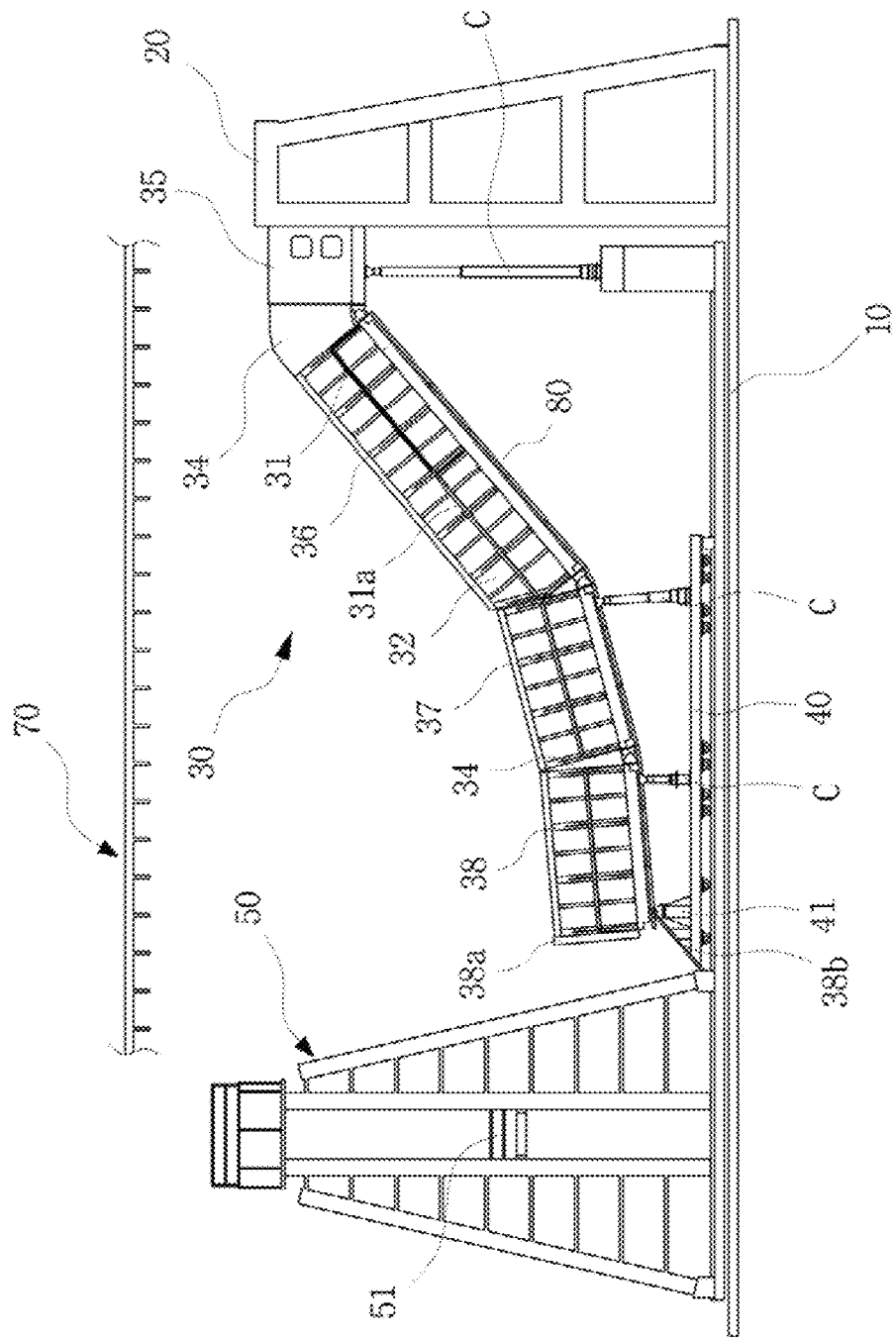
FIGS. 2A and 2B are views illustrating changes in angle of a soil tank structure of the integrated steep slope collapse simulation system illustrated in FIG. 1.
Figure 2B:
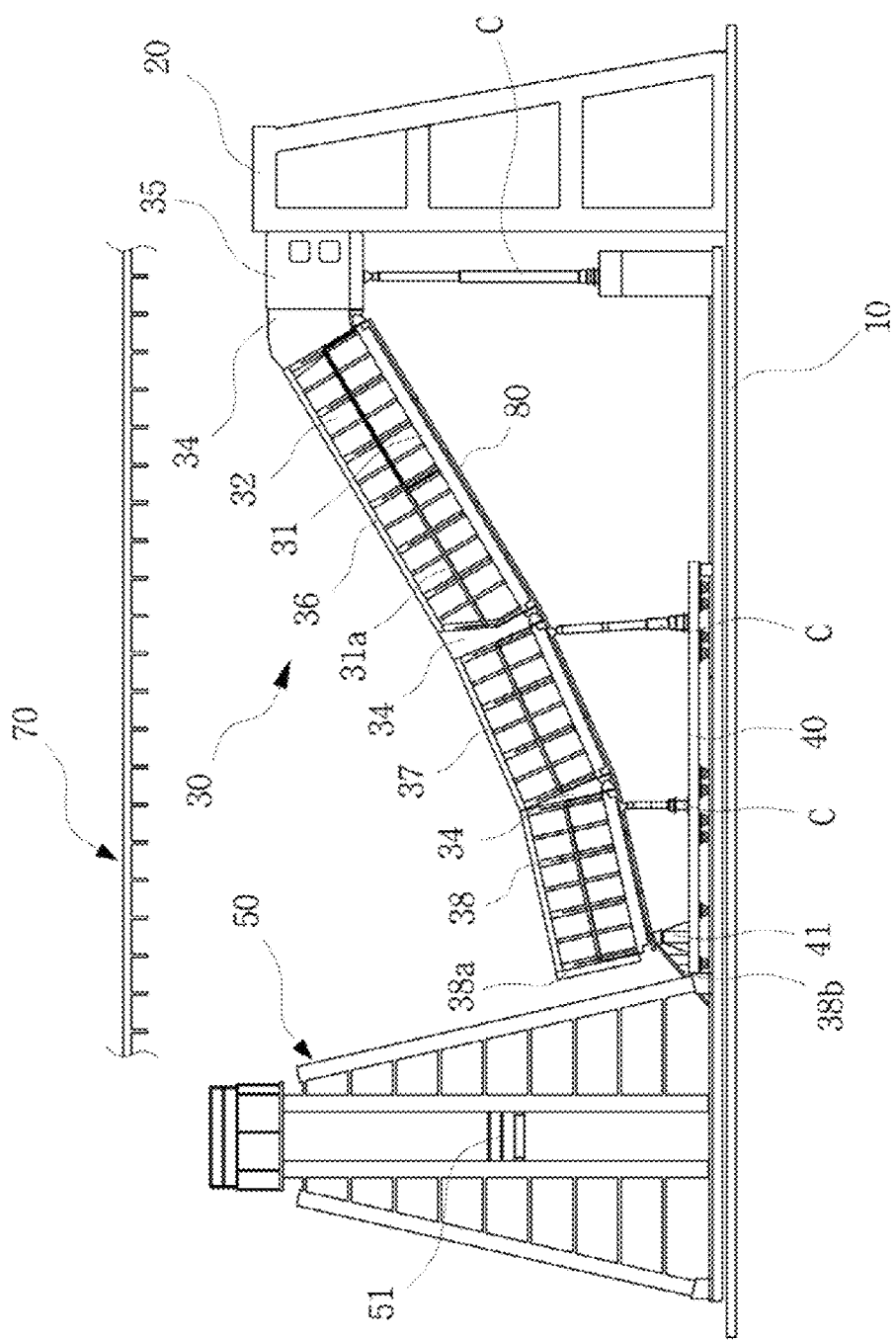
Figure 3:
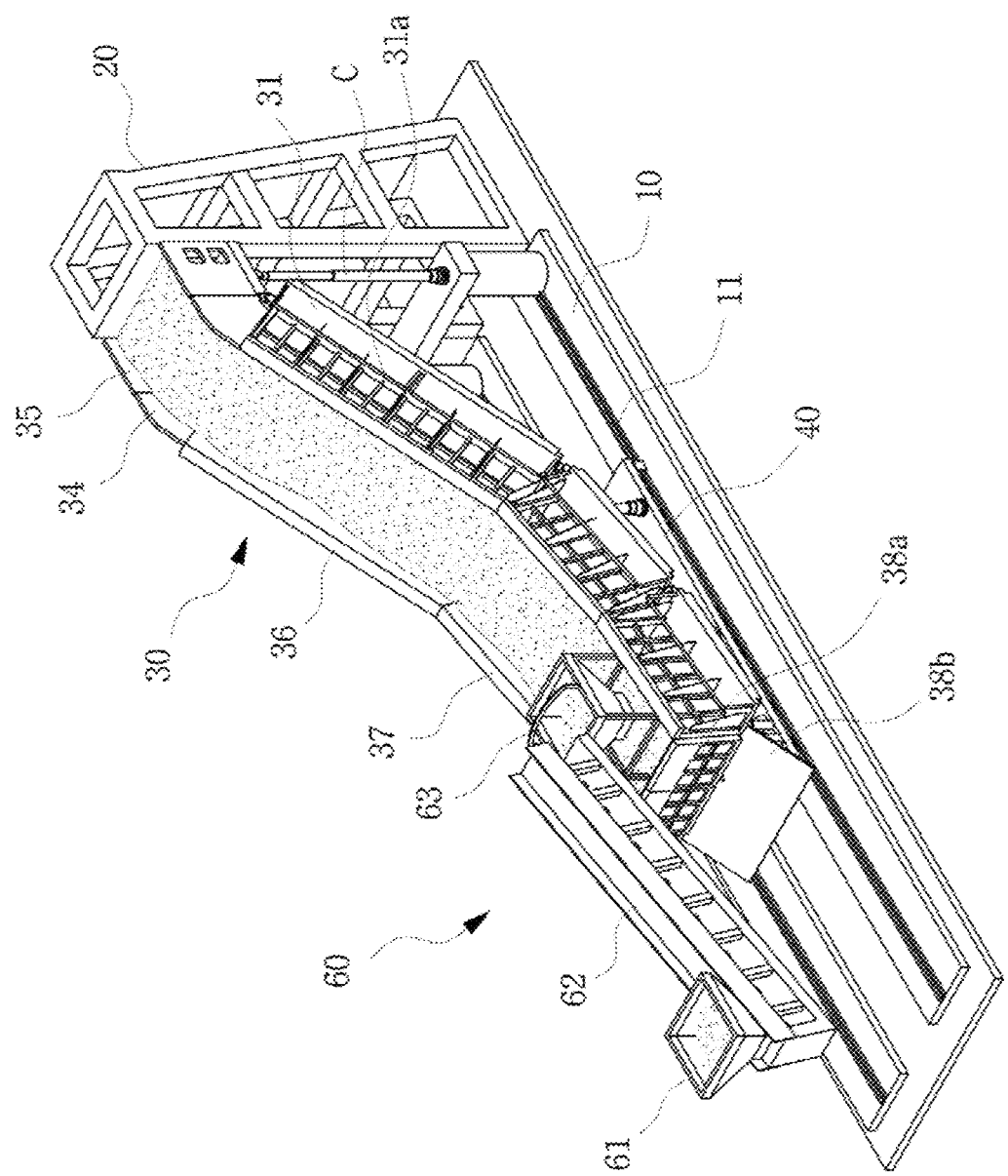
FIG. 3 is a view illustrating a state where the soil tank structure of the integrated steep slope collapse simulation system according to the present invention is filled with soil.

FIGS. 1A and 1B are perspective views of the integrated steep slope collapse simulation system according to the present invention. FIGS. 2A and 2B are views illustrating changes in the angle of the soil tank structure of the integrated steep slope collapse simulation system illustrated in FIG. 1. FIG. 3 is a view illustrating a state where the soil tank structure of the integrated steep slope collapse simulation system according to the present invention is filled with soil.

An integrated steep slope collapse simulation system according to the present invention includes a base 10, a tower 20 provided at one end of the base 10, a soil tank structure 30 having one side connected to the tower 20, a slider 40 provided on the upper surface of the base 10, a work platform 50 provided above the base 10, a soil moving device 60 supplying soil to the interior of the soil tank structure 30 an artificial rainfall device 70 provided above the soil tank structure 30, and an underground water reproduction device 80 supplying water to the interior of the soil tank structure 30 through the bottom surface of the soil tank structure 30.

The base 10 is manufactured by assembling a plurality of steel beams or steel frames, and then mounted on the ground. Rails 11 are provided along both sides of the base 10 to be elongated in the longitudinal direction.

The tower 20 is a structure configured by assembling steel beams or steel frames to be elongated in the vertical direction. The tower 20 serves to support one end of the soil tank structure 30 and to allow the one end of the soil tank structure 30 to be able to move up and down.

The soil tank structure 30 is provided such that one side thereof is connected to the tower 20 so as to be inclined. The height of the soil tank structure is increased toward the tower 20 and decreased further away from the tower 20. The interior of the soil tank structure is filled with soil, and the soil is rammed.

In the soil tank structure 30, a passage 31 is provided to be elongated along the side surface thereof, a transparent window 32 is provided on the side surface thereof, and a plurality of angulated tubes 33 are provided to be separated from each other on the bottom surface thereof.

The passage 31 serves as a way through which a worker moves, and a fence 31a is provided along the edge thereof to prevent the worker from falling off.

The transparent window 32 is made of polycarbonate so as to check the interior of the soil tank structure 30. The transparent window 32 is provided so as to monitor stable installation of various measurement instruments and experiment procedures in the soil tank structure 30 in a stable manner and to easily observe a collapse phenomenon of the soil filled in the soil tank structure 30.

The angulated tubes 33 are provided on the bottom surface of the soil tank structure 30 to protrude at certain intervals so that the angulated tubes are perpendicular to the inclination direction of the soil tank structure 30. The angulated tubes 33 form roughness on the bottom surface of the inclined soil tank structure 30 to simulate the natural condition and prevent the soil from slipping.

More specifically, the soil tank structure 30 includes a first soil tank 35, a second soil tank 36 connected to the first soil tank 35, a third soil tank 37 connected to the second soil tank 36, and a fourth soil tank 38 connected to the third soil tank 37.

The first soil tank 35 is provided to the tower 20 so as to be movable up and down. This first soil tank 35 is moved in the vertical direction by a hydraulic cylinder C provided to the base 10. That is, when the rod of the hydraulic cylinder C moves forward, the first soil tank 35 moves upward along the tower 20. When the rod of the hydraulic cylinder C moves backward, the first soil tank 35 moves downward along the tower 20.

The first soil tank 35 is the smallest in size among the soil tanks and is not provided with the transparent window 32 which is provided to the other soil tanks.

One end of the second soil tank 36 is rotatably connected to the end of the first soil tank 35. The lower end of the first soil tank 35 and the upper end of the second soil tank 36 are joined by a pin, so that the inclination angle is changed as the first soil tank 35 moves up and down. The second soil tank 36 is the largest in size among the soil tanks. The second soil tank 36 is configured to be adjustable at an angle of 15 to 40 degrees with respect to the horizontal plane so that it is possible to reproduce a steep slope.

One end of the third soil tank 37 is rotatably connected to the other end of the second soil tank 36. The lower end of the second soil tank 36 and the upper end of the third soil tank 37 are joined by a pin, so that the third soil tank 37 is rotated according to the change of the inclination angle of the second soil tank 36. The third soil tank 37 is rotated by the hydraulic cylinder C provided to the slider 40, so that the inclination angle thereof is adjusted. The third soil tank 37 is configured so as to be adjustable at an angle of 15 degrees or less with respect to the horizontal plane.

The fourth soil tank 38 is configured to have the same size as the third soil tank 37. On the end of the fourth soil tank 38 is rotatably connected to the other end of the third soil tank 37. The lower end of the third soil tank 37 and the upper end of the fourth soil tank 38 are joined by a pin, so that the fourth soil tank 38 is rotated according to the change of the inclination angle of the third soil tank 37. The fourth soil tank 38 is rotated by the hydraulic cylinder C provided to the slider 40 so that the inclination angle thereof is adjusted. The fourth soil tank 38 is configured so as to be adjustable at an angle of 5 degrees or less with respect to the horizontal plane.

An openable door 38a is provided at the other end of the fourth soil tank 38, and a slope plate 38b inclined downward is provided at the bottom of the other end of the fourth soil tank 38.

The door 38a is opened and closed by a hydraulic cylinder on both sides thereof. In the case of filling the soil tank structure 30 with the soil and ramming the soil and in the case of performing the collapse simulation, the door 38a is kept closed. After the collapse simulation is completed, the door 38a is opened.

The slope plate 38b is formed so as to allow the soil of the interior of the soil tank structure 30 to be easily discharged to the outside after the door 38a is opened.

On the other hand, spring steel plate members 34 made of a cold-rolled stainless steel plate are provided between the first soil tank 35 and the second soil tank 36, between the second soil tank 36 and the third soil tank 37, and between the third soil tank 37 and the fourth soil tank 38 so as to prevent leakage of the soil.

The slider 40 is moved along the base 10 in a state where the underside of the soil tank structure 30 is supported. More specifically, the slider 40 is provided with hydraulic cylinders C for adjusting the inclination angles of the third soil tank 37 and the fourth soil tank 38 on the upper surface of the slider 40. A support 41 rotatably provided on the bottom surface of the fourth soil tank 38 is provided on the upper surface of the slider 40. In this state, the slider 40 moves forward or backward along the longitudinal direction of the base 10. The slider 40 moves forward and backward according to the change of the inclination angle of the soil tank structure 30.

The work platform 50 includes a working stand 51 that moves along the base 10 and moves up and down and is provided with a hoist 52. The work platform 50 is moved by a roller along the longitudinal direction of the base 10. When the work platform 50 is moved toward the tower 20 the working stand 51 is located above the soil tank structure 30.

The working stand 51 is moved up and down by a chain mechanism in the work platform 50. The working stand provides a space for workers to move during the steep slope collapse simulation or equipment installation. The working stand 51 is provided at the central portion thereof with a soil supply hole 51a which is elongated in the left/right direction.

The hoist 52 lifts and moves various devices necessary for the procedure or a secondary hopper 63 to be described later. In other words, the hoist 52 lifts up the secondary hopper 63 moves at a constant speed from the left end to the right end and from the right end to the left end along the soil supply hole 51a allows the soil tank structure 30 to be filled with the soil through the soil supply hole 51a. In this manner, since the soil is discharged while moving the soil supply hole 51a left and right at a constant speed, the soil can be prevented from being diffused and falling to the outside of the soil tank structure 30 so that the soil can be distributed uniformly in the soil tank structure 30.

The soil and soil moving device 60 supplies the soil with which the soil tank structure 30 is to be filled. The soil moving device 60 includes a primary hopper 61, a conveyor 62, and a secondary hopper 63.

The primary hopper 61 allows external soil to be introduced into the interior thereof.

The conveyor 62 receives the soil from the primary hopper 61 at one end thereof, and the other end thereof is suspended to the fourth soil tank 38 of the soil tank structure 30 so as to convey the received soil.

The secondary hopper 63 receives the soil from the conveyor 62 and stores the received soil in the interior thereof. As described above, the hoist 52 lifts up the secondary hopper 63, and the soil is supplied through the soil supply hole 51a of the working stand 51.

In the present invention, the soil may be supplied through the above-described soil moving device 60. However, it is also possible to carry and ram the soil by using construction equipment such as an excavator.

The artificial rainfall device 70 injects water downward toward the soil rammed in the soil tank structure 30. The artificial rainfall device 70 is provided with a fixed nozzle 71 at the center thereof, and variable nozzle 72 rotating at a certain angle on both sides of the fixed nozzle 71. With this configuration of the artificial rainfall device 70, water serving as rainwater can be assisted to be uniformly injected on the inclined soil slope.

The underground water reproduction device 80 injects water upward from the underside of the soil, which is rammed in the soil tank structure 30, through the bottom surface of the soil tank structure 30. More specifically, the underground water reproduction device 80 has one side penetrating the bottom surface of the soil tank structure 30, and the penetrating portion is connected to the angulated tubes 33 provided to the bottom surface of the soil tank structure 30. At this time, discharge holes 33a are formed in the angulated tubes 33 at certain intervals, and the water supplied from the underground water reproduction device 80 is discharged through the discharge holes 33a. Therefore, the water supplied from the underside of the soil rammed in the soil tank structure 30 serves as underground water.

On the other hand, the integrated steep slope collapse simulation system according to the present invention may further includes a control room (not illustrated) constructed to intuitively check the experimental situation and to enable automatic control of various components. In this control room, simulation conditions of artificial rainfall, an inclination angle of an actual-size steep slope, a hydraulic pressure, or the like can be adjusted.

In addition, the integrated steep slope collapse simulation system according to the present invention may further include a soil storage device (not illustrated) capable of collecting and storing various types of soil. The soil storage device may be equipped with a constant temperature/humidity function, so that the soil can be stored under optimum conditions.

What is claimed is:
1. An integrated steep slope collapse simulation system comprising:
　a base;
　a tower provided at one end of the base;
　a soil tank structure having one side being connected to the tower so that the soil tank structure is inclined, the soil tank structure being filled with soil, and the soil being rammed;
　a work platform provided with a working stand moving along the base and moving up and down;
　a soil moving device supplying soil to an interior of the soil tank structure, wherein the soil moving device includes: a primary hopper into which soil is introduced; a conveyor receiving the soil from the primary hopper and conveying the soil; and a secondary hopper receiving the soil from the conveyor, wherein a soil supply hole being elongated in a left/right direction is formed at a central portion of the working stand, and the work platform is provided with a hoist, and wherein the hoist lifts up the secondary hopper and allows the interior of the soil tank structure to be filled with the soil through the soil supply hole while moving left and right along the soil supply hole;
　an artificial rainfall device provided above the soil tank structure, the artificial rainfall device injecting water downward toward the soil rammed inside the soil tank structure; and
　an underground water reproduction device injecting water upward through the bottom surface of the soil tank structure from the underside of the soil rammed in the soil tank structure.

2. The Integrated steep slope collapse simulation system according to claim 1, wherein a slider moving along the base is provided on an upper surface of the base in a state where an underside of the soil tank structure is supported.

3. The Integrated steep slope collapse simulation system according to claim 2, wherein the soil tank structure includes:
a first soil tank provided vertically movably in the tower;
a second soil tank having one end rotatably connected to one end of the first soil tank;
a third soil tank having one end rotatably connected to the other end of the second soil tank; and
a fourth soil tank having one end rotatably connected to the other end of the third soil tank.

4. The Integrated steep slope collapse simulation system according to claim 3,
wherein the first soil tank is moved up and down by a hydraulic cylinder C provided to the base, and
wherein the third soil tank and the fourth soil tank are rotated by hydraulic cylinders C provided to the slider.

5. The Integrated steep slope collapse simulation system according to claim 3, wherein a door which is opened and closed by a hydraulic cylinder C is provided to the other end of the fourth soil tank, and a slope plate inclined downward is provided on the bottom surface of the other end of the fourth soil tank.

6. The Integrated steep slope collapse simulation system according to claim 1, wherein the soil tank structure is provided with a passage along a side surface thereof.

7. The Integrated steep slope collapse simulation system according to claim 1, wherein the soil tank structure is provided with a transparent window along a side surface thereof.

8. The Integrated steep slope collapse simulation system according to claim 1, wherein a plurality of angulated tubes are separated from each other so as to protrude from the bottom surface of the soil tank structure so that the angulated tubes are perpendicular to an inclination direction of the soil tank structure.

9. The Integrated steep slope collapse simulation system according to claim 8, wherein the angulated tubes are connected to the underground water reproduction device and have discharge holes formed at certain intervals to discharge water supplied from the underground water reproduction device through the discharge holes.

10. The Integrated steep slope collapse simulation system according to claim 1, wherein the artificial rainfall device is provided with a fixed nozzle at a center thereof and variable nozzles rotating at a certain angle on both sides of the fixed nozzle.

* * * * *